(12) United States Patent
Liu et al.

(10) Patent No.: US 12,008,732 B2
(45) Date of Patent: Jun. 11, 2024

(54) SUPER-RESOLUTION OF BLOCK-COMPRESSED TEXTURE FOR TEXTURE MAPPING APPLICATIONS

(71) Applicant: SONY GROUP CORPORATION, Tokyo (JP)

(72) Inventors: Ming-Chang Liu, San Jose, CA (US); Liyu Gong, Lexington, KY (US); Ko-Kai Albert Huang, San Jose, CA (US); Joshua Scott Hobson, Los Angeles, CA (US)

(73) Assignee: SONY GROUP CORPORATION, Tokyo (JP)

( * ) Notice: Subject to any disclaimer, the term of this patent is extended or adjusted under 35 U.S.C. 154(b) by 527 days.

(21) Appl. No.: 17/217,047

(22) Filed: Mar. 30, 2021

(65) Prior Publication Data

US 2021/0312592 A1 Oct. 7, 2021

Related U.S. Application Data

(60) Provisional application No. 63/003,953, filed on Apr. 2, 2020.

(51) Int. Cl.
*G06K 9/00* (2022.01)
*G06F 18/20* (2023.01)
(Continued)

(52) U.S. Cl.
CPC ........ *G06T 3/4053* (2013.01); *G06F 18/2163* (2023.01); *G06F 18/285* (2023.01);
(Continued)

(58) Field of Classification Search
CPC ... G06T 3/4053; G06T 9/002; G06F 18/2163; G06F 18/285; G06N 3/08; G06N 20/00;
(Continued)

(56) References Cited

U.S. PATENT DOCUMENTS 10,102,663 B2  10/2018  Cerny
10,453,274 B2  10/2019  Kwon
(Continued)

FOREIGN PATENT DOCUMENTS

CN  108416736 A  8/2018
CN  109410239 A  3/2019
(Continued)

OTHER PUBLICATIONS

Taubman, David, et al. "Embedded block coding in JPEG 2000." Signal Processing: Image Communication 17.1 (2002): 49-72. ( Year: 2002).*
(Continued)

*Primary Examiner* — Andrew M Moyer
(74) *Attorney, Agent, or Firm* — CHIP LAW GROUP

(57) ABSTRACT

A method for super-resolution of block-compressed texture is provided. The method includes receiving a first texture block of a first block size. Based on application of a first block compression (BC) scheme on the received first texture block, coded-texture values are generated in a compressed domain. Further, a first machine learning model is applied on the generated coded-texture values to generate super-resolution coded-texture values in the compressed domain. The generated super-resolution coded-texture values are processed to generate a second texture block of a second block size. The second block size is greater than the first block size.

18 Claims, 10 Drawing Sheets

(51) Int. Cl.
*G06F 18/21* (2023.01)
*G06N 3/08* (2023.01)
*G06N 20/00* (2019.01)
*G06T 3/4053* (2024.01)
*G06T 9/00* (2006.01)
*G06V 10/82* (2022.01)

(52) U.S. Cl.
CPC ............... *G06N 3/08* (2013.01); *G06N 20/00* (2019.01); *G06T 9/002* (2013.01); *G06V 10/82* (2022.01)

(58) Field of Classification Search
CPC ........ G06N 3/045; G06N 3/048; G06N 3/063; G06V 10/82; H04N 19/176
See application file for complete search history.

(56) References Cited

U.S. PATENT DOCUMENTS

| | | | | |
|---|---|---|---|---|
| 2008/0303841 | A1* | 12/2008 | Newhall, Jr. | G06T 15/04 345/587 |
| 2010/0034477 | A1* | 2/2010 | Crisan | G06T 3/4053 382/232 |
| 2018/0338159 | A1* | 11/2018 | Kapoor | H04N 23/951 |

FOREIGN PATENT DOCUMENTS

| | | |
|---|---|---|
| EP | 2708268 A2 | 3/2014 |
| EP | 2708268 A3 | 5/2014 |
| EP | 2479723 B1 | 2/2015 |
| JP | 2010050976 A | 3/2010 |
| JP | 2018151747 A | 9/2018 |
| KR | 20180050140 A | 5/2018 |
| WO | WO-2019197674 A1 | 10/2019 |

OTHER PUBLICATIONS

Lee, Yongje, Chae-Eun Rhee, and Hyuk-Jae Lee. "A new frame recompression algorithm integrated with H. 264 video compression." 2007 IEEE International Symposium on Circuits and Systems. IEEE, 2007. (Year: 2007).*

Takemura, Shintaro. "Optimize deep super-resolution and denoising for compressed textures." SIGGRAPH Asia 2018 Posters. 2018. 1-2. (Year: 2018).*

Chen, et al., "CISRDCNN: Super-Resolution of Compressed Images using Deep Convolutional Neural Networks", Neurocomputing, Sep. 2017, pp. 204-219.

* cited by examiner

SUPER-RESOLUTION OF BLOCK-COMPRESSED TEXTURE FOR TEXTURE MAPPING APPLICATIONS

CROSS-REFERENCE TO RELATED APPLICATIONS/INCORPORATION BY REFERENCE

This application claims priority to U.S. Provisional Patent Application Ser. No. 63/003,953 filed on Apr. 2, 2020, the entire content of which is hereby incorporated herein by reference.

FIELD

Various embodiments of the disclosure relate to three-dimensional (3D) rendering systems, image super-resolution, and machine learning. More specifically, various embodiments of the disclosure relate to a method and a system to perform a super-resolution of block-compressed texture for texture mapping applications.

BACKGROUND

Advancements in 3D rendering systems and computer graphics have led to adoption of high-resolution textures for various 3D rendering applications, such as gaming, augmented reality, virtual reality, and 2D/3D animations. Traditionally, developers or studios, for example, game studios want to render computer graphics (for example, in games) with a high fidelity but want to avoid releasing a texture library with a high resolution. This may be done to keep the file size of content (for example, game files) as small as possible. Without texture compression, it may be difficult to reasonably reduce the file size. For instance, existing methods compress texture images into encoded bit-stream. The encoded bitstream may be decoded to a low-resolution image. The low-resolution image may be scaled up with known methods, such as bilinear or bicubic interpolation to obtain a high resolution image, which may be re-encoded into another bitstream and sent to a graphic processing unit for rendering. Because of the high fidelity requirement, existing interpolation (e.g. bilinear, bicubic) methods may not be applicable or suitable because they would produce blurred images. Also, there is a higher computational cost associated with the existing methods, which makes them less useful for real-time or near real-time rendering applications.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system to perform a super-resolution of block-compressed texture for texture mapping applications is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and a method for super-resolution of a block-compressed texture for texture mapping applications. Exemplary aspects of the disclosure provide a system that may be configured to receive a texture image (for example, a texture image associated with a gaming application). The system may divide the received texture image into a plurality of texture blocks, each of which may be of a first block size (for example, 4×4 texels). Based on application of a first block compression (BC) scheme on the first texture block, the system may generate coded-texture values in a compressed domain. The system may apply a first machine learning (ML) model on the generated coded-texture values to generate super-resolution coded-texture values in the compressed domain. The system may process the generated super-resolution coded-texture values to generate a second texture block of a second block size (for example, 8×8 texels). The second block size may be greater than the first block size.

Traditionally, developers or studios, for example, game studios want to render computer graphics (for example, in games) with a high fidelity but want to avoid releasing texture library with a very high resolution to keep the file size as small as possible (storage and transmission cost). The present disclosure allows content (for example, a game content or an eXtended Reality (XR) content, or animation content) to be delivered with lower resolution textures but rendered with higher resolution textures in real time or near real time. The present disclosure does not require decoding and re-encoding of a bitstream or modifying software-development environments (such as game engines). Instead, it utilizes machine learning in the compressed domain directly to achieve super-resolution at runtime.

The present disclosure addresses unmet needs of developers and studios. For example, for game studios, such requirements include availability of texture super-resolution for gaming at run-time with a high fidelity and at a high speed (real time or near-real time rendering). Because of the high fidelity requirement, existing interpolation (e.g. bilinear, bicubic) based methods may not be applicable because they would produce blurred images. The present disclosure not only produces better image quality than those existing methods thanks to the sophisticated mapping function (i.e. the machine learning model) in compressed domain. The known existing approach may take the encoded bitstream, decode it to an image, and scale up the lower-resolution images with known algorithms, such as bilinear or bicubic interpolation. Thereafter, the high resolution image may be re-encoded into another bitstream and sent to a Graphics Processing Unit (GPU) for rendering. However, this process may be computational costly, and the interpolation method used may result in unsatisfactory image quality, such as blurred edge boundaries.

Figure 1:
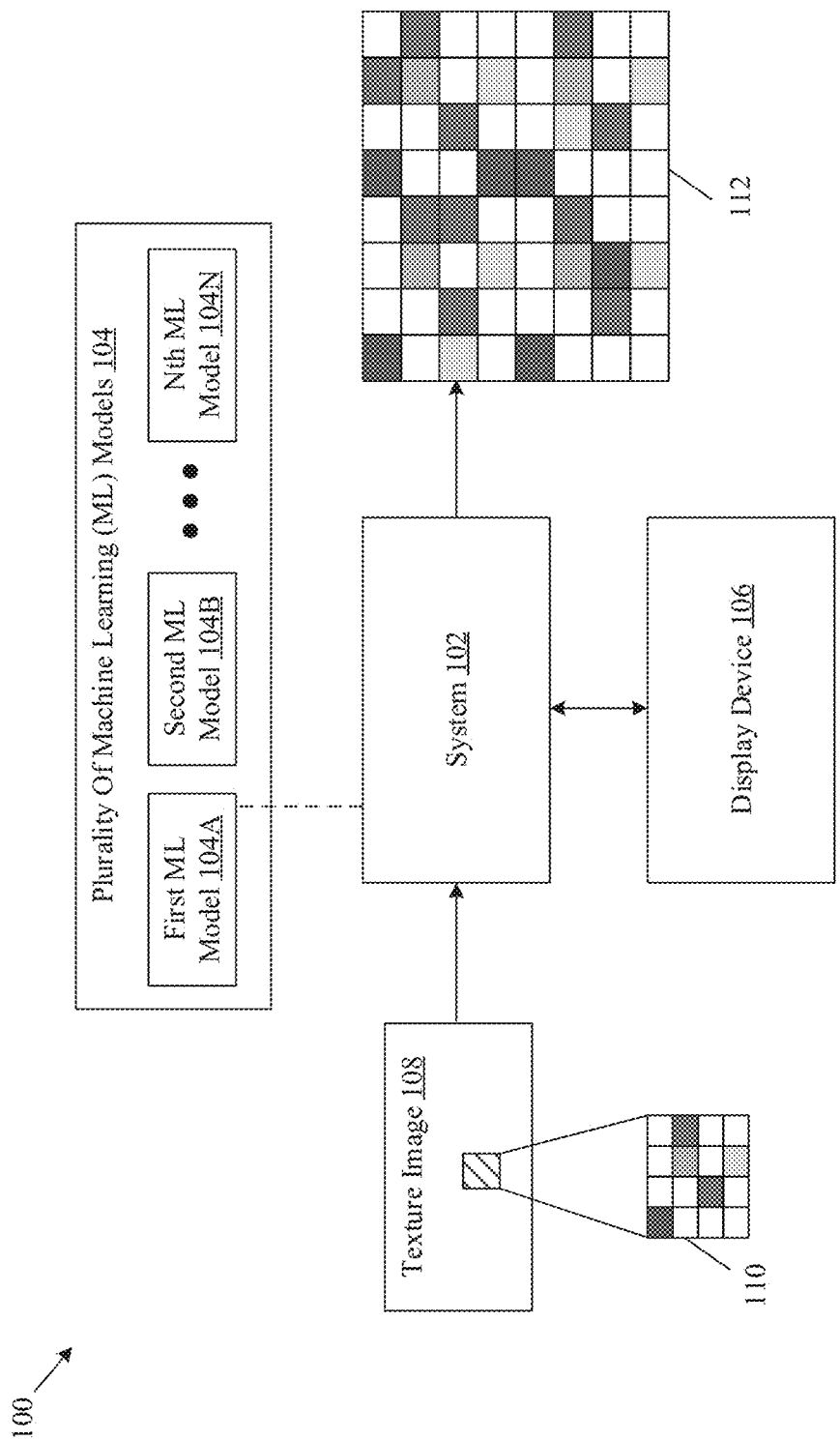
FIG. 1 is a block diagram that illustrates an exemplary network environment for super-resolution of block-compressed texture for texture mapping applications, in accordance with an embodiment of the disclosure.

FIG. 1 is a block diagram that illustrates an exemplary network environment for super-resolution of block-compressed texture for texture mapping applications, in accordance with an embodiment of the disclosure. With reference to FIG. 1, there is shown a network environment 100. The network environment 100 may include a system 102 and a display device 106. There is also shown a plurality of machine learning (ML) models 104 on the system 102. The plurality of ML models 104 may include a first ML model 104A, a second ML model 104B . . . and an Nth ML model 104N. There is also shown a texture image 108 and a first texture block 110 of the texture image 108.

The system 102 may include suitable logic, circuitry, and interfaces that may be configured to generate a super-resolution texture from an input low-resolution texture (e.g., the texture image 108). The generated super-resolution texture may be used in one or more operations of a graphics rendering pipeline. By way of example, and not limitation, such operations may be shader operations or a part of a shader pipeline on a Graphic Processing Unit (GPU) of the system 102.

For image super-resolution, the system 102 may apply a first block compression (BC) scheme on a first texture block 110 (of a first block size) of the texture image 108 to generate coded-texture values (in compressed domain). The system 102 may apply the first ML model 104A on the generated coded-texture values to generate super-resolution coded-texture values in the compressed domain. Based on processing of the super-resolution coded-texture values, the system 102 may further generate a second texture block 112 of a second block size (which may be more than the first block size). Examples of the system 102 may include, but are not limited to, a gaming device (such as a game console, a wearable headset (such as an eXtended Reality (XR) headset), or an in-vehicle gaming system), a personal computer, a server (such as a game server or a cloud-based game streaming server (which offers gaming-as-a-service)), a game engine, a GPU (or a cluster of connected GPUs), a personal computer, a smartphone, a mobile computer, GPU-integrated game monitors, a mainframe machine, a computer work-station, and/or any computing device with a capability to render graphics.

Each ML model of the plurality of ML models 104 may be a regression model which may be trained to interpolate information (or additional coded-texture values in the compression domain), which may be required to upscale or up-sample a texture block (such as the first texture block 110) of a first block size (for example, 4×4 texels) to a texture block (such as the second texture block 112) of a second block size (for example, 8×8 texels). In an embodiment, each ML model of the plurality of ML models 104 may be separately trained to handle coded-texture values associated with a particular mode of a BC compression scheme.

Each ML model (for example, the first ML model 104A) may be defined by its hyper-parameters, for example, number of weights, cost function, input size, number of layers, and the like. The hyper-parameters of the first ML model 104A may be tuned before or after every cycle of training of the respective ML model. During several epochs of training, parameters such as weights of the respective ML model may be updated till a global minimum of a cost function for the first ML model 104A is achieved. After several epochs of the training on input features of the training dataset, the first ML model 104A may be determined as trained.

The first ML model 104A may include electronic data, which may be implemented as, for example, a software component of an application executable on the system. The first ML model 104A may rely on libraries, external scripts, or other logic/instructions for execution by a processing device, such as the system 102. The first ML model 104A may include code and routines configured to enable a computing system, such as the system 102 to perform one or more operations, such as the generation of the super-resolution coded-texture values. Additionally or alternatively, the first ML model 104A may be implemented using hardware including, but not limited to, a processor, a microprocessor (e.g., to perform or control performance of one or more operations), a field-programmable gate array (FPGA), a co-processor (such as an Artificial Intelligence (AI) accelerator), or an application-specific integrated circuit (ASIC). Alternatively, in some embodiments, the first ML model 104A may be implemented using a combination of both hardware and software.

In some embodiments, the first ML model 104A may be a neural network-based model. The neural network model may be a computational network or a system of artificial neurons, arranged in a plurality of layers, as nodes. The plurality of layers of the neural network model may include an input layer, one or more hidden layers, and an output layer. Each layer of the plurality of layers may include one or more nodes or artificial neurons (represented by circles, for example). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters (and topology information) of the neural network. Such hyper-parameters may be set before, while training, or after training the neural network on a training dataset.

Each node of the neural network model may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to the same or a different mathematical function. An exemplary implementation of the first ML model 104A as a neural network-based model is described, for example in FIG. 5.

In training of the neural network model, one or more parameters of each node of the neural network may be updated based on whether an output of the final layer for a given input (from the training dataset) matches a correct result based on a loss function for the neural network. The above process may be repeated for the same or a different input till a minima of loss function may be achieved, and a training error may be minimized. Several methods for training are known in art, for example, gradient descent, stochastic gradient descent, batch gradient descent, gradient boost, meta-heuristics, and the like. Details of the training of the first ML model 104A are further described, for example in FIG. 6. Other ML models (such as the second ML model 104B and the Nth ML model 104N) may be functionally (parameter-wise and topologically) be the same as the first ML model 104A (described, for example, in FIG. 1). The description of the other ML models of the plurality of ML models 104 is omitted from the disclosure for the sake of brevity.

The display device 106 may include suitable logic, circuitry, and interfaces that may be configured to display a three-dimensional or a 2D dimensional graphics which includes a super-resolution texture (generated by the system 102). The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 106 may refer to a display screen of an electronic device, a smartphone, a computer, a head mounted device (HMD), a smart-glass device, a see-through display, a projection-based display, an electro-chromic display, or a transparent display.

In FIG. 1, the display device 106 is shown as separate from the system 102. However, the disclosure may not be so limiting and in some embodiments, the display device 106 may be integrated into the system 102, without departing from the scope of the disclosure.

In operation, the system 102 may receive the texture image 108. For example, the texture image 108 may be received from a server or may be locally retrieved from a storage unit of the system 102. The texture image 108 may be associated with a graphics rendering application, such as, but not limited to, gaming, augmented reality, virtual reality, and 2D/3D animations. The system 102 may divide the received texture image 108 into a plurality of texture blocks. The plurality of texture blocks may include, for example, the first texture block 110. Each of the plurality of texture blocks may be of a first block size. By way of example, and not limitation, the first block size may be 4×4 texels (also referred to as texture pixels or texture elements). In many scenarios, the first block size may not be sufficient for the graphics rendering application, which requires a higher texture resolution. A re-scaling or up-sampling (for example, by a factor of 4) of each texture block may be required to meet the requirements of the graphics rendering application, as described herein.

The system 102 may select a first block compression (BC) scheme from among a plurality of block compression schemes. In accordance with an embodiment, the first BC scheme specifies a first BC format which is one of several BC formats, such as BC1 format, BC2 format, BC3 format, BC4 format, BC5 format, BC6 format, or BC7 format. In some embodiments, the first BC format specified in the first BC scheme is in a first mode, which may be one of fourteen modes of the BC6 format or eight modes of the BC7 format.

After the BC scheme is selected, the system 102 may apply the first BC scheme on the received first texture block 110. Based on the application of the first BC scheme, the system 102 may generate a first compressed bit-stream. In some embodiments, the system 102 may also convert a first block of code bits of the generated first compressed bit-stream to generate coded-texture values in the compressed domain. Details of the generation of the coded-texture values are further provided, for example in FIG. 4A.

The system 102 may further select an ML model (for example, the first ML model 104A) from among the plurality of ML models 104, based on a determination that the first compressed bit-stream may be associated with a first mode (for example, Mode 1) of a first BC format (BC7 format) specified in the first BC scheme. Each of the ML model of the plurality of ML models 104 may be associated with a corresponding mode of the first BC format. The system 102 may apply the selected first ML model 104A on the generated coded-texture values to generate super-resolution coded-texture values in the compressed domain. The super-resolution coded-texture values may include sets of coded-texture values that may be required to upscale (or up-sample) the first texture block 110 of the first block size (for example, 4×4 texels) to the second texture block 112 of a second block size (for example, 8×8 texels). Details of the application of the first ML model 104A to generate the super-resolution coded-texture values are further provided, for example in FIG. 4B.

After the generation of the super-resolution coded-texture values, the system 102 may process the generated super-resolution coded-texture values to generate the second texture block 112 of the second block size (for example, 8×8 texels, 16×16 texels, and the like). The second block size may be greater than the first block size by a factor (for example, 4, 16, and the like). In some embodiments, the generated second texture block 112 may be a super-resolution texture block, which may imply that a resolution of the second texture block 112 may be more than the first texture block 110. Thus, in general, the term "super-resolution" may refer to a higher resolution. In accordance with an embodiment, the processing may include conversion of the super-resolution coded-texture values in the compressed domain to a second compressed bit-stream. The second compressed bit-stream may include a set of second blocks of coded-bits, each of which represents, in the compressed domain, a corresponding portion (for example, one of four 4×4 blocks) of the second texture block 112 (for example, of 8×8 texels). The processing may further include decoding (for example, using the GPU) the second compressed bit-stream to generate the second texture block 112. In one or more embodiments, the decoding may include application of a first block decoding scheme in a block-wise manner on the set of second blocks of coded-bits to generate respective portions of the second texture block 112 in a first-in-first-out (FIFO) pattern. Details of the processing of the super-resolution coded-texture values to generate the second texture block 112 are further provided, for example in FIG. 4B.

Figure 2:
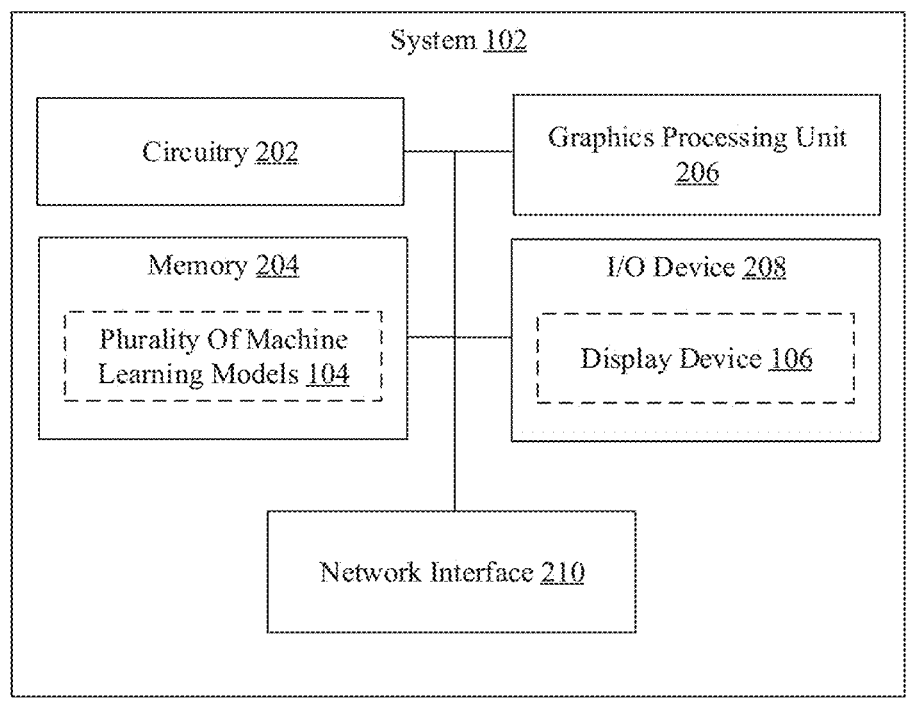
FIG. 2 is a block diagram that illustrates an exemplary system for super-resolution of block-compressed texture for texture mapping applications, in accordance with an embodiment of the disclosure.

FIG. 2 is a block diagram that illustrates an exemplary system for super-resolution of block-compressed texture for texture mapping applications, in accordance with an embodiment of the disclosure. FIG. 2 is explained in conjunction with elements from FIG. 1. With reference to FIG. 2, there is shown a block diagram 200 of the system 102. The system 102 may include circuitry 202 and a memory 204. The memory 204 may store the plurality of ML models 104. The system 102 may further include a graphics processing unit (GPU) 206 and an input/output (I/O) device 208. The I/O device 208 may include the display device 106, for example. The system 102 may also include a network interface 210.

The circuitry 202 may include suitable logic, circuitry, and interfaces that may be configured to execute program instructions associated with different operations to be executed by the system 102. For example, some of the operations may include generation of the coded-texture values in the compressed domain based on application of the first BC scheme on the first texture block 110 of the first block size. The operations may further include application of the first ML model 104A on the generated coded-texture values to generate the super-resolution coded-texture values in the compressed domain. Based on the processing of the super-resolution coded-texture values, the circuitry 202 may further generate the second texture block 112 of the second block size.

The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a GPU, a field programmable gate array (FPGA), programmable logic devices (PLDs), an application specific integrated circuit (ASIC), a programmable ASIC (PL-ASIC), application specific integrated parts (ASSPs), a System-on-Chip (SOC) based on standard microprocessors (MPUs) or digital signal processors (DSPs), a Reduced Instruction Set Computing (RISC) processor, a Complex Instruction Set Computing (CISC) processor, a microcontroller, a co-processor (such as an AI accelerator, a vision processing unit, or a neuromorphic chip), a central processing unit (CPU), and/or a combination thereof.

The memory 204 may include suitable logic, circuitry, and interfaces that may be configured to store the program instructions executable by the circuitry 202. The memory 204 may be configured to also store the plurality of ML models 104, texture images (such as the texture image 108) in compressed or in uncompressed form, texture blocks (such as the first texture block 110) of the texture image 108, intermediate results (such as compressed domain values), and super-resolution texture blocks (such as the generated second texture block 112). Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The GPU 206 may include suitable logic, circuitry, and interfaces that may be configured to execute operations related to graphics rendering, the processing of the super-resolution coded texture values to generate super-resolution texture blocks (which may be used in a shader pipeline), and other ancillary computations. Examples implementations of the GPU 206 may include, but are not limited to, an integrated GPU, a discrete GPU, a hybrid or multi-GPU implementation, a general purpose GPU (GPGPU) and an external GPU.

The I/O device 208 may include suitable logic, circuitry, and interfaces that may be configured to receive an input from a user and provide an output based on the received input. The I/O device 208 which may include various input and output devices, may be configured to communicate with the circuitry 202. For example, the system 102 may receive a user input via the I/O device 208 to render 3D graphics associated with a graphics rendering application (for example, a gaming application or a game software) on the display device 106. Examples of the I/O device 208 may include, but are not limited to, a touch screen, a display device, a keyboard, a mouse, a joystick, a microphone, and a speaker.

The network interface 210 may include suitable logic, circuitry, and interfaces that may be configured to facilitate communication between the system 102 and a server (for example, a server on which the texture image 108 is stored), via a communication network (not shown in FIG. 2). The network interface 210 may further be configured to facilitate communication between the system 102 and an electronic device associated with a user of the graphics rendering application. The network interface 210 may be implemented by use of various known technologies to support wired or wireless communication of the system 102 with the communication network.

The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), 5th Generation New Radio (5G NR), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the system 102, as described in FIG. 1, may be performed by the circuitry 202. Operations executed by the circuitry 202 are described in detail, for example, in FIGS. 4A and 4B.

Figure 3:
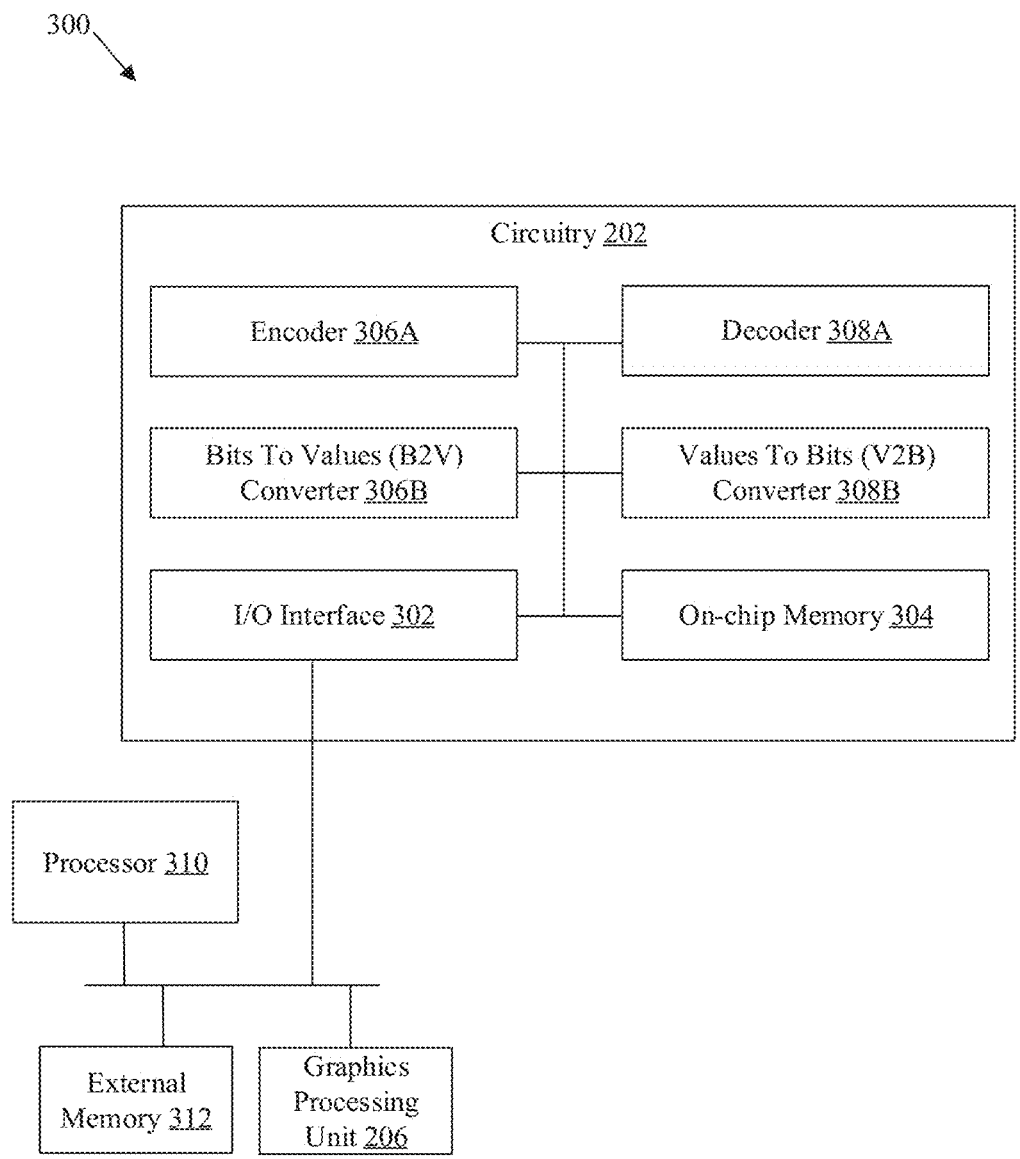
FIG. 3 is a block diagram that illustrates an exemplary implementation of a system as a codec chipset for super-resolution of block-compressed texture, in accordance with an embodiment of the disclosure.

FIG. 3 is a block diagram that illustrates an exemplary implementation of a system as a codec chipset for super-resolution of block-compressed texture, in accordance with an embodiment of the disclosure. FIG. 3 is explained in conjunction with elements from FIGS. 1 and 2. With reference to FIG. 3, there is shown a block diagram 300, which depicts an exemplary implementation of the system 102 as a codec (coder-decoder) chipset. The system 102 may include the circuitry 202, which may include an input/output (I/O) interface 302, an on-chip memory 304, an encoder 306A, and a decoder 308A. The circuitry 202 may further include a bits-to-values (B2V) converter 306B and a values-to-bits (V2B) converter 308B. The block diagram 300 of the system 102 may further include a processor 310, an external memory 312, and the GPU 206 communicatively coupled to the circuitry 202, via a system bus or the I/O interface 302. In some embodiments, the processor 310, the external memory 312, and the GPU 206 may be integrated into the circuitry 202, without departing from the scope of the disclosure.

The I/O interface 302 may include suitable logic, circuitry, and interfaces that may be configured to manage a plurality of I/O ports to facilitate exchange of communication data from other circuitries or devices, via a network of system bus, for example, the external memory 312, the processor 310, or the GPU 206. The communication data may include, for example, a bit-stream of the coded texture, control signals, CPU instructions, and the like. The configuration of the I/O ports may depend on a specification, a form factor, or design of the circuitry 202.

The on-chip memory 304 may include suitable logic, circuitry, and interfaces that may be configured to store different operational data (e.g., the texture image 108 and the first texture block 110) that may be utilized by different components of the circuitry 202 to re-scale or up-scale an image block (such as the first texture block 110). Examples of the operational data that the on-chip memory 304 may be configured to store, may include, but are not limited to, the coded-texture values, information related to BC schemes, compressed bit-streams, and/or the plurality of ML models 104. The on-chip memory 304 may be implemented as a specific memory designed with a defined memory specification, such as R/W speed, memory size, fabrication factors, and the like. Examples of the on-chip memory 304 may include, but are not limited to, static random access memory (SRAM), dynamic access memory (DRAM), and Static Dynamic RAM (SD-RAM).

The encoder 306A may include suitable logic, circuitry, and interfaces that may be configured to generate a first compressed bit-stream by application of a block compression (BC) scheme on a texture block (for example, a 4×4 texels block, an 8×8 texels block, and the like). The texture block may be stored in memory, such as the on-chip memory 304 or the external memory 312. The encoder 306A may be optimized to reduce a number of bits that may be used to encode the first texture block 110 to improve a compaction efficiency and/or a compression factor of the texture block. In some embodiments, the encoder 306A may be a hardware encoder chip that may be implemented based on one of ASIC, programmable logic devices (PLDs), SOC, FPGA, digital signal processors (DSPs) or other specialized circuitries. In other embodiments, the encoder 306A may be implemented as a combination of hardware and stored set of instructions in the on-chip memory 304 (for example, instructions based on VHDL or HDL logic).

The B2V converter 306B may include suitable logic, circuitry, and interfaces that may be configured to convert the first block of code bits of the generated first compressed bit-stream to generate the coded-texture values. The conversion may include, for example, one-hot encoding of the code bits. In some embodiments, the B2V converter 306B may be a hardware chip that may be implemented based on one of ASIC, programmable logic devices (PLDs), SOC, FPGA, digital signal processors (DSPs) or other specialized circuitries. In other embodiments, the B2V converter 306B may be implemented as a combination of hardware and stored set of instructions in the on-chip memory 304 (for example, instructions based on VHDL or HDL logic).

The decoder 308A may include suitable logic, circuitry, and interfaces that may be configured to decode a second compressed bit-stream associated with the super-resolution coded-texture values (obtained from the first ML model 104A). The decoder 308A may have pre-stored quantization tables and coding tables that may act as a reference for the decoder 308A to decode the second compressed bit-stream. In some embodiments, the decoder 308A may be a hardware encoder chip that may be implemented based on one of ASIC, programmable logic devices (PLDs), SOC, FPGA, digital signal processors (DSPs) or other specialized circuitries. In other embodiments, the decoder 308A may be implemented as a combination of hardware and stored set of instructions in the on-chip memory 304 (for example, instructions based on VHDL or HDL logic).

The V2B converter 308B may include suitable logic, circuitry, and interfaces that may be configured to convert the sets of coded-texture values associated with the super-resolution coded-texture values into the set of second blocks of coded-bits. The decoder 308A may apply a first block decoding scheme in a block-wise manner on the set of second blocks of coded-bits to generate respective portions of the second texture block 112 in a first-in-first-out (FIFO) pattern. In some embodiments, the V2B converter 308B may be a hardware chip that may be implemented based on one of ASIC, programmable logic devices (PLDs), SOC, FPGA, digital signal processors (DSPs) or other specialized circuitries. In other embodiments, the V2B converter 308B may be implemented as a combination of hardware and stored set of instructions in the on-chip memory 304 (for example, instructions based on VHDL or HDL logic).

The processor 310 may include suitable logic, circuitry, and interfaces that may be configured to execute defined instructions stored in memory (e.g., the external memory 312 or the on-chip memory 304). The processor 310 may be implemented based on a number of processor technologies known in the art. Examples of the processor 310 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The external memory 312 may include suitable logic, circuitry, and interfaces that may be configured to store the texture image 108 (uncompressed raw or encoded) or the plurality of texture blocks which includes the first texture block 110. The external memory 312 may be further configured to act as an image buffer to store the plurality of texture blocks retrieved from the GPU 206. Additionally, the external memory 312 may store instructions associated with sequential encoding/decoding schemes that may be selectively applied, by the circuitry 202, to generate compressed bit-streams.

In an embodiment, the external memory 312 may be a dynamic random access memory (DRAM) that may be externally interfaced with the circuitry 202. In another embodiment, the external memory 312 may be static random access memory (SRAM) that may be externally interfaced with the circuitry 202. Further examples of implementation of the external memory 312 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

Figure 4A:
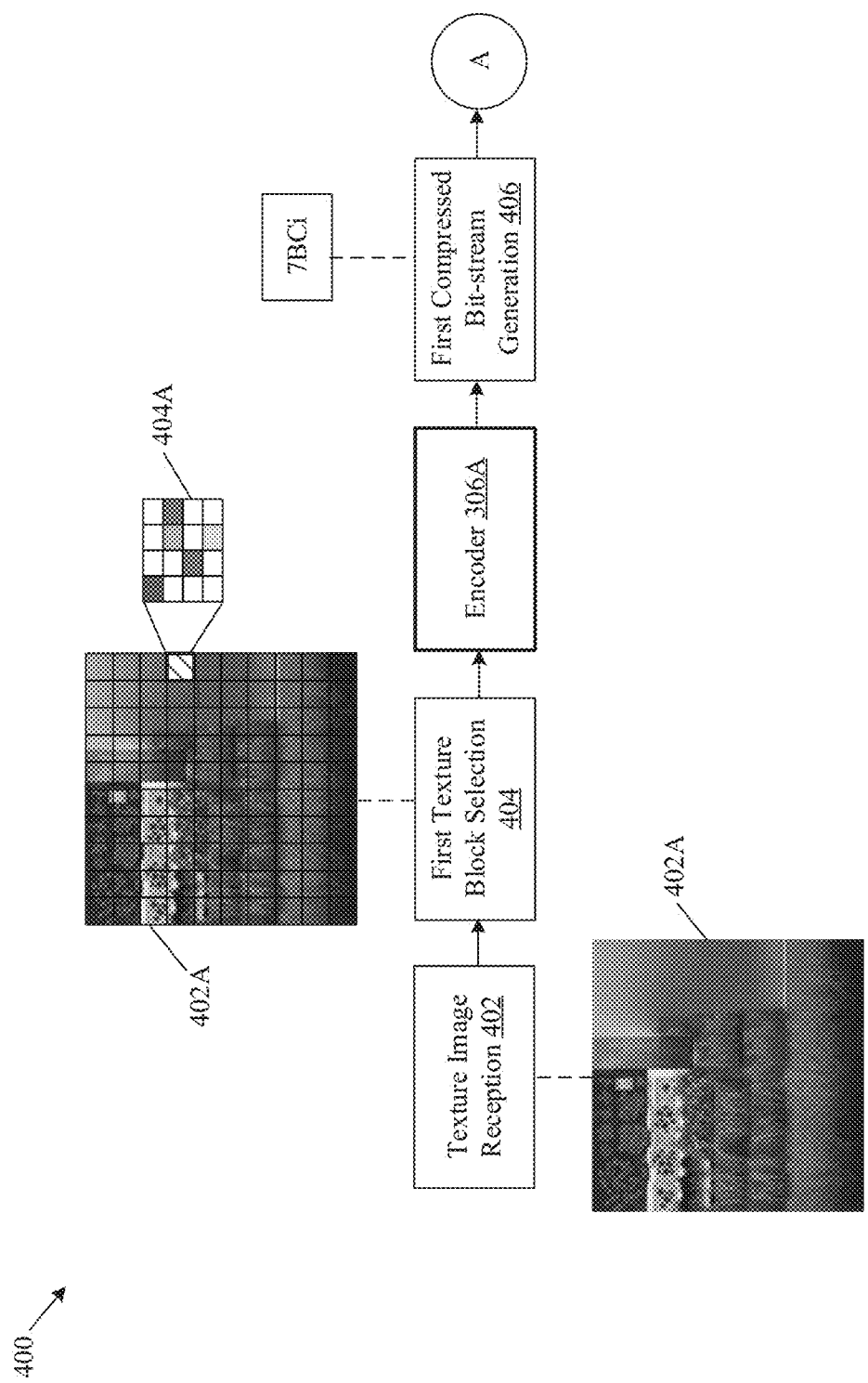
FIGS. 4A and 4B, collectively, illustrate exemplary operations for super-resolution of block-compressed texture for texture mapping applications, in accordance with an embodiment of the disclosure.
Figure 4B:
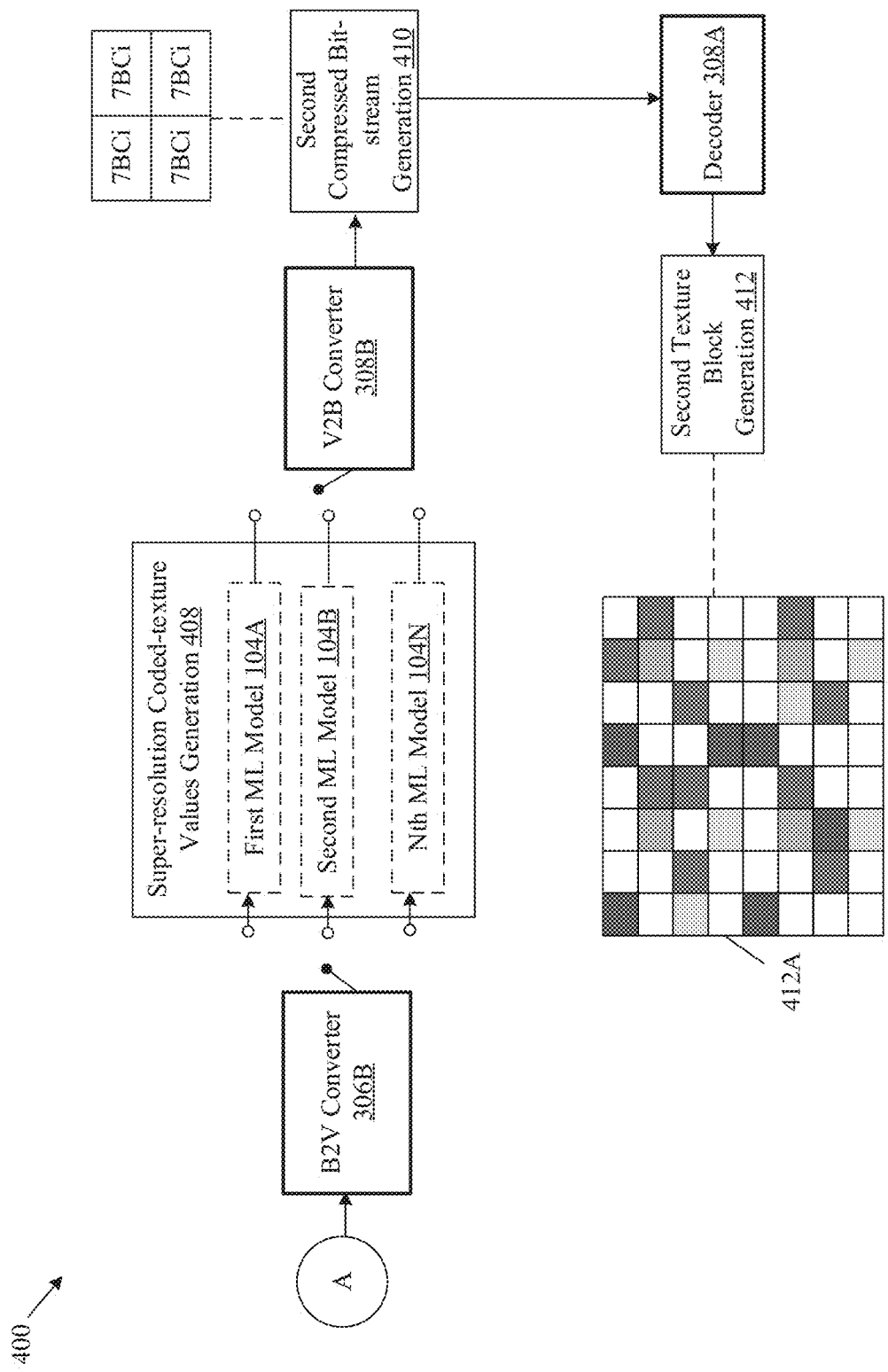

FIGS. 4A and 4B are diagrams that collectively illustrate exemplary operations for super-resolution of block-compressed texture, in accordance with an embodiment of the disclosure. FIGS. 4A and 4B are explained in conjunction with elements from FIGS. 1, 2, and 3. With reference to FIGS. 4A and 4B, there is shown a diagram 400 which includes exemplary operations from 402 to 412. which starts at 402.

At 402, a texture image 402A may be received. In accordance with an embodiment, the circuitry 202 may be configured to receive the texture image 402A. The texture image 402A may be required in one or more operations (for example, texture and shader operations) associated with a graphics rendering application, such as, but not limited to, a game, a game development engine, an XR application, and a 2D/3D animation. In an embodiment, the texture image 402A may be decoded from a set of texture files, which may be included in a software package or a texture library of the graphics rendering application.

In many instances, texture resolution of the texture image 402A or a block size of individual texture blocks of the texture image 402A may be insufficient for the operations associated with the graphics rendering application. In such instances, such operations may require a higher texture resolution. A re-scaling or up-sampling of the texture image 402A or each texture block may be required to meet the requirements of the operations associated with the graphics rendering application. The circuitry 202 may be configured to divide the received texture image 402A into a plurality of texture blocks, each of which may be of a first block size, for example, 4×4 texels.

At 404, a first texture block 404A may be selected from the plurality of texture blocks. In accordance with an embodiment, the circuitry 202 may select the first texture block 404A of the first block size. In accordance with an embodiment, the circuitry 202 may be configured to select a first block compression (BC) scheme from among a plurality of BC schemes. Such schemes may specify a particular BC format (and a mode of the BC format) that may be used to compress the plurality of texture blocks of the texture image 402A.

In some embodiments, the selected first BC scheme may specify a first BC format, which may be one of several compression formats specified in S3 texture compression (which includes a group of lossy texture compression algorithms). Examples of the first BC format may include, but are not limited to, a BC1 format, a BC2 format, a BC3 format, a BC4 format, a BC5 format, a BC6 format, or a BC7 format. By way of example, and not limitation, a set of BC formats and individual texture blocks that each BC format may handle, is provided in Table 1, which is given as follows:

TABLE 1

| BC Format | Texture format handled by the BC format |
|---|---|
| BC1 | RGB + optional 1 bit alpha |
| BC2 | RGB + 4 bit alpha |
| BC3 | RGBA |
| BC4 | Grayscale |
| BC5 | 2-channel grayscale |

TABLE 1-continued

| BC Format | Texture format handled by the BC format |
|---|---|
| BC6 | RGB, floating point |
| BC7 | RGB or RGBA |

The BC1 format of the first BC scheme may encode a three-component color data of the first texture block 404A using a 5:6:5 representation of the color data (such as 5 bits of red, 6 bits of green and 5 bits of blue) of the first texture block 404A. Further, the BC1 format may encode an alpha data of the first texture block 404A using 1 bit. The alpha data may be used to determine an opacity level of each texel of the first texture block 404A. The BC1 format may allow storage of 16 colors (based on the 5:6:5 representation of the color data) and 16 2-bit color indices of the first texture block 404A. The 2-bit color indices may be used to identify the color of each texel of the first texture block 404A.

The BC2 format may encode the color information of the first texture block 404A, such as red-green-blue (RGB) information as a 5:6:5 representation of the color information (such as 5 bits red, 6 bits green and 5 bits blue). The BC2 format may encode the alpha data of the first texture block 404A as 4 bits of the texel.

The BC3 format may encode the color information of the first texture block 404A using 5:6:5 representation of the color information (such as 5 bits red, 6 bits green, 5 bits blue). The BC3 format may encode the alpha data of the first texture block 404A in one byte. The BC4 format may encode one-component color information (for example, grayscale color information) of the first texture block 404A using 8 bits. In an embodiment, the BC4 format may allow storage of two reference colors, such as "0" corresponding to a bit when red color is absent and "1" corresponding to a bit when the red color is present in the texel of the first texture block 404A. The BC4 format may further allow storage of 16 3-bit color indices of the first texture block 404A.

The BC5 format may encode two-component color information of the first texture block 404A using 8 bits of the texel for each color of the color information. In an embodiment, the BC5 format may allow storage of two reference colors of each component. The BC5 format may allow storage of 16 3-bit color indices for each component of the two-component color information of the first texture block 404A.

In accordance with an embodiment, the first BC format specified in the first BC scheme may be in a first mode, which may be one of fourteen modes of the BC6 format or eight modes of the BC7 format. A set of eight different modes (represented by the index i) of BC7 format and corresponding texture data handled by each mode and number of subsets for each respective mode are provided in Table 2, which is shown as follows:

TABLE 2

BC7 modes and characteristics

| Mode i | Data | Subsets |
|---|---|---|
| 0 | RGB | 3 |
| 1 | RGB | 2 |
| 2 | RGB | 3 |
| 3 | RGB | 2 |
| 4 | RGBA | 1 |
| 5 | RGBA | 1 |
| 6 | RGBA | 1 |
| 7 | RGBA | 2 |

The BC6 format and the BC7 format may allow different modes (such as the first mode) that may alter the details of the BC format. BC6 format and BC7 format may specify endpoints (for example, 2 endpoints) to describe color segments for interpolation of texels (or pixels) in a texture block. The BC6 format and the BC7 format may further specify indices, each of which may correspond to a weight of each pixel for the interpolation. For example, for a 4×4 texture block, mode 7 of the BC7 format may produce a set of 16 indices, which is shown as follows:

TABLE 3

16 2-bit indices

| 11 | 10 | 10 | 01 |
|----|----|----|----|
| 10 | 01 | 11 | 01 |
| 01 | 10 | 11 | 01 |
| 00 | 11 | 01 | 00 |

Each mode may have different characteristics, such as a supported color (color components and alpha channel), a number of subsets per block, a pattern of endpoints (e.g., RGBP 4.4.4.1 endpoints with a unique P-bit per endpoint), a bit-size of each index (e.g., 3-bit index), and number of partitions (e.g., 16 partitions). Each mode (such as each of the fourteen modes) of the BC6 format or each mode (such as each of the eight modes) of the BC7 format can be used for block compression of the first texture block 404A. The different modes of the BC6 format and the BC7 format may be selected for a trade-off between different factors, such as between a required precision and compression speed. BC-n formats are well known to one ordinarily skilled in the art; therefore, further details of BC-n formats have been omitted from the disclosure for the sake of brevity.

At 406, the selected first BC scheme may be applied to the first texture block 404A to generate the first compressed bit-stream. In accordance with an embodiment, the encoder 306A of the circuitry 202 may be configured to apply the selected first BC scheme to the first texture block 404A to generate the first compressed bit-stream. The first compressed bit-stream may be formatted in accordance with the first BC format of the selected first BC scheme.

For example, the encoder 306A may select the mode 7 of the BC7 format as the first BC scheme. The encoder 306A may use the selected mode 7 of the BC7 format for compression of the first texture block 404A. A selected mode of the BC7 format may be represented as 7BCi, where "i" represents one of the modes of the BC7 format. A representation of the generated first compressed bit-stream (based on the selected mode 7 of the BC7 format (7BC7)) is shown in Table 4, as follows:

TABLE 4

First compressed bit-stream based on BC7 format-mode 7 (7BC7)

| LSB | 00000001 | | | |
|---|---|---|---|---|
| | 6 bit partition | | | |
| | 5 bits R0 | 5 bits R1 | 5 bits R2 | 5 bits R3 |
| | 5 bits G0 | 5 bits G1 | 5 bits G2 | 5 bits G3 |
| | 5 bits B0 | 5 bits B1 | 5 bits B2 | 5 bits B3 |
| | 5 bits A0 | 5 bitsA1 | 5 bits A2 | 5 bits A3 |
| | 1 bit P0 | 1 bit P1 | 1 bit P2 | 1 bit P3 |
| 30 bits indices | | | | MSB |

The "6 bit partition" bit in Table 4 represents the partition type of the mode 7 of the BC7 format. The bits "5bits R0" till "1 bit P3" in Table 4 represent the endpoints of the mode 7 of the BC7 format. R corresponds to color red, G corresponds to color green, B corresponds to color blue, A corresponds to alpha, and P corresponds to a lowest bit of all channels of the mode 7 of the BC7 format. The "30 bits" represents 16 indices, each of which is a weight for interpolation of texels using the endpoints.

In accordance with an embodiment, the generated first compressed bit-stream may be input to the B2V converter 306B. The B2V converter 306B may convert a first block of code bits of the generated first compressed bit-stream to generate the coded-texture values. For example, as part of the conversion, 6 bit partition in the first compressed bit-stream may be converted to a 64×1 one-hot encoding vector. The 4×RGBA endpoints of the first compressed bit-stream may be converted into 16×1 floating points values (normalized to (0,1)). The B2V converter 306B may convert the 16×2-bit pixel indices represented by the "30 bits" into 16×1 floating point values (normalized to (0,1)). Each of the two subsets within the block may be assumed to start with a bit "0". The circuitry 202 may generate the coded-texture values in the compressed domain, based on the application of the first BC scheme on the received first texture block 404A.

At 408, the first ML model 104A may be applied to the generated coded-texture values to generate the super-resolution coded-texture values in the compressed domain. In some embodiments, the first ML model 104A may be selected from the plurality of ML models 104. The selection of the first ML model 104A may be based on the selected first BC scheme. In one or more embodiments, the selection of the first ML model 104A may be selected based on the determination that the generated first compressed bit-stream is associated with the first mode (for example, mode 7) of the first BC format (for example, BC7 format) specified in the first BC scheme.

In some embodiments, the plurality of ML models 104 may include an ML model, each for a particular BC format, such as the BC1 format, the BC2 format, . . . or the BC7 format. In one or more embodiments, each ML model of the plurality of ML models 104 may be associated with a corresponding mode of a plurality of modes of the first BC format. For example, the plurality of ML models 104 may include fourteen ML models, each one for a respective mode of the BC6 format. Alternatively, the plurality of ML models 104 may include eight ML models, each for a respective mode of the BC7 format. Each ML model of the plurality of ML models 104 may be trained separately in accordance with the respective BC format. The training of the first ML model 104A is further described, for example, in FIG. 6.

In accordance with an embodiment, the application of the selected first ML model 104A may include feeding the generated coded-texture values as input to the selected first ML model 104A. For example, if the first ML model 104A is associated with the mode 7 of the BC7 format, then the coded-texture values generated based on the selected mode 7 of the BC7 format may be input to the first ML model 104A. Based on the input, the first ML model 104A may generate the super-resolution coded-texture values. The super-resolution coded-texture values may include sets of coded-texture values (four sets of coded-texture values) which may be required to upscale the first texture block 404A to the second texture block 412A. For example, the first texture block 404A of a first block size may be required to be upscaled by factor of "M" to generate the second texture block 412A of the second block size. The ratio of the second block size to the first block size may be a positive integer (M) that may be greater than one.

In an embodiment, the first block size of the first texture block 404A may be 4×4 texels. The first texture block 404A may have be to upscaled by a factor of 2 to obtain the second texture block (which may be 8×8 texels). In this case, the sets of coded-texture values that may be required to upscale the first texture block 404A to the second texture block may be obtained by the application of first ML model 104A. The first ML model 104A may be trained to generate four sets of coded-texture values (as part of the super-resolution coded-texture values), based on the input coded-texture values associated with the first texture block 404A. Each set of the generated four sets of coded-texture values may be used to generate a 4×4 texture block and together the four set of coded-texture values may be used to generate an 8×8 texture block.

In accordance with an embodiment, a mipmap level required by a shader of the GPU 206 may be determined. Mipmaps may be an optimized sequence of images, where each image in the sequence represents a lower resolution than a previous image. The mipmaps are typically used in speeding up rendering times, either by reducing a number of texels sampled to render each pixel, or by increasing the memory locality of the samples taken. Each image in the sequence of images be associated with a mipmap level. Each mipmap level may be a power of two smaller than a previous mipmap level. The shader of the GPU 206 may be utilized to shade or provide texture to a three-dimensional (3D) mesh. The mipmap level (required by the shader) may be determined to appropriately set the second block size (or a scale factor by which a texture block should be re-scaled or upscaled). The circuitry 202 may signal the determined mipmap level to the selected first ML model 104A of the plurality of ML models 104. Based on the signaled mipmap level, the first ML model 104A may set the second block size of the second texture block (such as the second texture block 412A). For example, the first ML model 104A may set the second block size as 8×8 texels or a scale factor of 4. Based on the set second block size, the first ML model 104A may generate the super-resolution coded-texture values in the compressed domain. The circuitry 202 may further process the generated super-resolution coded-texture values, as described herein. As part of the processing, the super-resolution coded-texture values may be input to the V2B converter 308B.

At 410, the V2B converter 308B may convert the super-resolution coded-texture values in the compressed domain to a second compressed bit-stream. The generated second compressed bit-stream may include a set of second blocks of coded-bits, each of which may represent, in the compressed domain, a corresponding portion (for example, a 4×4 block) of the second texture block (such as the second texture block 412A).

In an embodiment, for each set of coded-texture values in the super-resolution coded-texture values, the V2B converter 308B may convert the 64×1 one-hot encoding vector of the super-resolution coded-texture values into a 6 bit partition. The V2B converter 308B may further convert 16×1 floating point values normalized to (0,1) into 4×RGBA endpoints and 16×1 floating points values normalized to (0,1) into 16×2 (32) bit indices to generate the second compressed bit-stream. 30 bits instead of the 32 bits may be considered for the indices due to an assumption that each of the two subsets within the block start with a bit "0".

At 412, the second texture block 412A may be generated. In accordance with an embodiment, the second compressed bit-stream may be input to the decoder 308A to generate the second texture block 412A. The processing of the super-resolution coded-texture values may include input of the second compressed bit-stream to the decoder 308A. The decoder 308A may decode the second compressed bit-stream to generate the second texture block 412A of the second block size. The second block size may be greater than the first block size. For example, the second block size of the generated second texture block 412A may be 8×8 texels.

In accordance with an embodiment, the decoding of the second compressed bit-stream may include application of a first block decoding scheme in a block-wise manner on the set of second blocks of coded-bits to generate respective portions (for example, 4×4 blocks) of the second texture block 412A in a first-in-first-out (FIFO) pattern. Alternatively, the decoder 308A may decode each pixel-by-pixel (in a defined pattern) the second texture block 412A.

Figure 5:
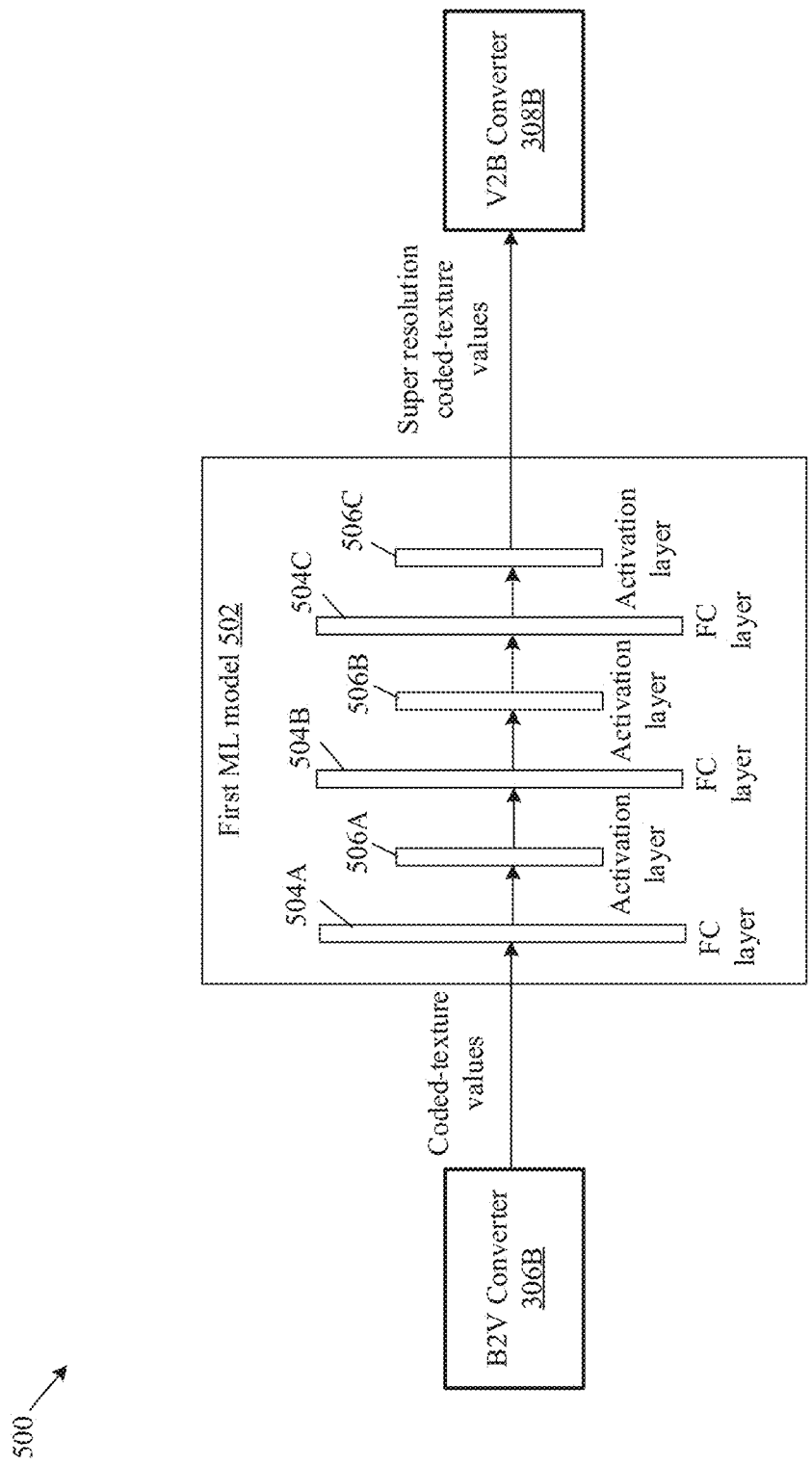
FIG. 5 is a diagram that illustrates an exemplary architecture of a machine learning model for super-resolution of block-compressed texture, in accordance with an embodiment of the disclosure.

FIG. 5 is a diagram that illustrates an exemplary architecture of a machine learning model for super-resolution of block-compressed texture, in accordance with an embodiment of the disclosure. FIG. 5 is explained in conjunction with elements from FIGS. 1, 2, 3, 4A, and 4B. With reference to FIG. 5, there is shown an architecture 500 of a first ML model 502, which may be exemplary implementation of the first ML model 104A of FIG. 1.

The first ML model 502 may include a plurality of fully connected layers, such as a fully connected layer 504A, a fully connected layer 504B, and a fully connected layer 504C. The first ML model 502 may further include a plurality of activation layers, such as an activation layer 506A, an activation layer 506B, and an activation layer 506C. Examples of the plurality of activation layers may include, but are not limited to, an exponential linear unit, a linear activation layer, a rectified linear unit, a sigmoid function, or a softmax function.

The output of the B2V converter 306B may be input to the fully connected layer 504A of the first ML model 502. The fully connected layer 504A may be connected to the activation layer 506A. The activation layer 506A may be further connected to the fully connected layer 504B. Further, the fully connected layer 504B may be connected to the activation layer 506B. The activation layer 506B may be connected to the fully connected layer 504C. The fully connected layer 504C may be connected to the activation layer 506C. The output of the activation layer 506C and may be input to the V2B converter 308B of the circuitry 202.

The coded-texture values generated by the B2V converter 306B may be input to the fully connected layer 504A. The coded-texture values may go through a series of the plurality of fully connected layers and the plurality of activation layers, such as the activation layer 506A and the activation layer 506B and the activation layer 506C to generate the super-resolution coded-texture values (which may be referred to as interpolation of the input coded-texture values). The output of the activation layer 506C may be fed as the input to the V2B converter 308B of the circuitry 202. The V2B converter 308B may output the second compressed bit-stream, based on the received input.

Figure 6:
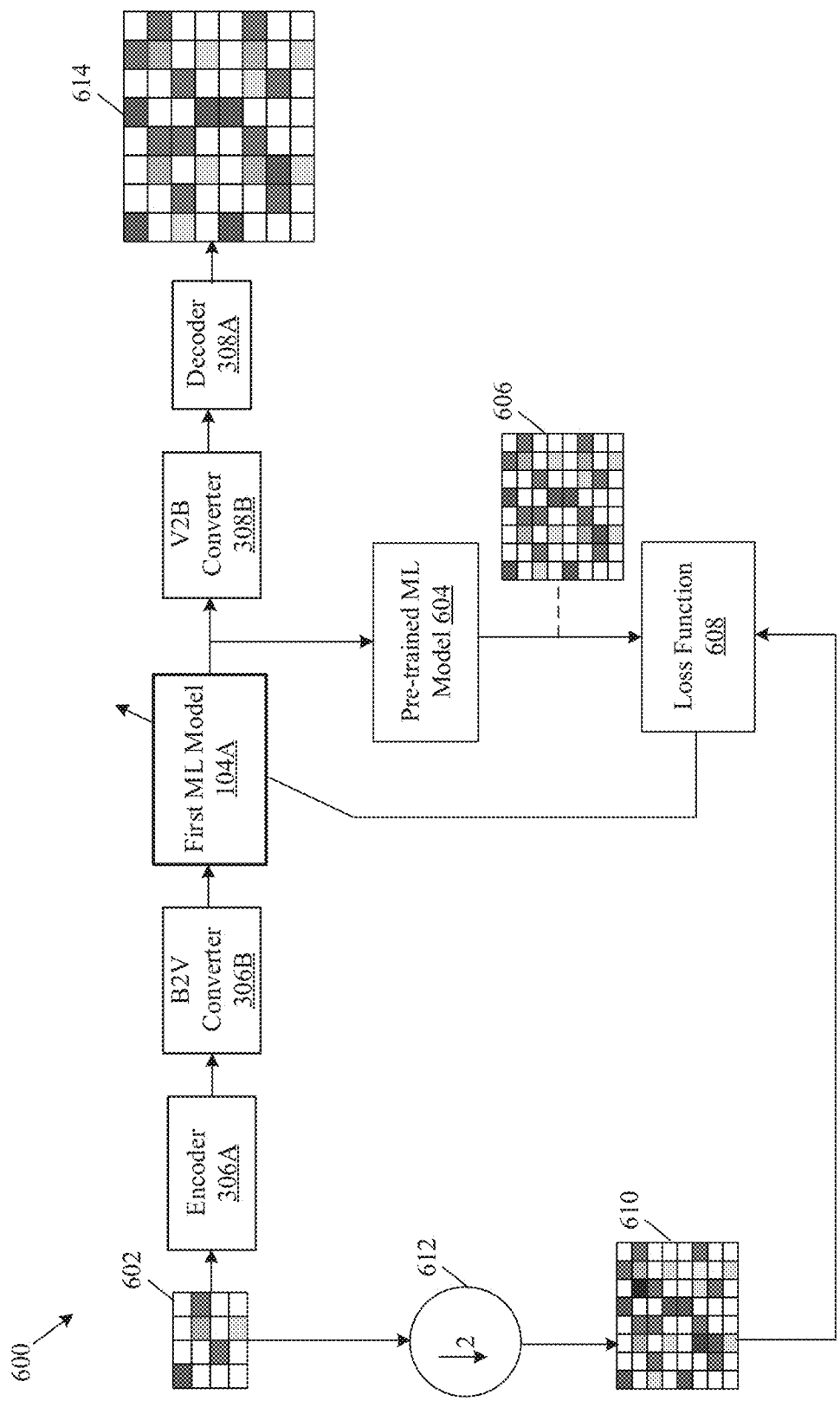
FIG. 6 is a diagram that illustrates exemplary operations for training of a machine learning model for super-resolution of block-compressed texture, in accordance with an embodiment of the disclosure.

FIG. 6 is a diagram that illustrates exemplary operations for training a machine learning model for super-resolution of block-compressed texture, in accordance with an embodiment of the disclosure. FIG. 6 is explained in conjunction with elements from FIGS. 1, 2, 3, 4A, 4B, and 5. With reference to FIG. 6, there is shown a diagram 600. The diagram 600 may include the first ML model 104A, the encoder 306A, the B2V converter 306B, the decoder 308A, and the V2B converter 308B. The diagram 600 may further include a first sample texture block 602, a pre-trained ML model 604, a second sample texture block 606, a loss function 608, a multiplier function 612, a ground truth texture block 610, a multiplier function 612, and a super-resolution texture block 614.

In accordance with an embodiment, the first ML model 104A may be the neural network-based model. For the training of the first ML model 104A, the first ML model 104A may receive the first sample texture block 602 of the first block size. For example, the first block size may be 4×4 texels. In some embodiments, the circuitry 202 may receive a sample texture image and may divide the sample texture image into a plurality of sample texture blocks (which includes the first sample texture block 602).

The first sample texture block 602 may be input to the encoder 306A of the circuitry 202, which may generate a first sample compressed bit-stream by applying the first BC scheme on the received first sample texture block 602. The first BC scheme may specify the first BC format, which may be one of BC1 format, BC2 format, BC3 format, BC4 format, BC5 format, BC6 format, or BC7 format. The generated first sample compressed bit-stream may be input to the B2V converter 306B. The B2V converter 306B of the circuitry 202 may convert the sample compressed bit-stream into first sample coded-texture values.

The circuitry 202 may apply the first ML model 104A on the first sample coded-texture values to generate second sample coded-texture values. The generated second sample coded-texture values may be input to the pre-trained ML model 604. In one or more embodiments, the circuitry 202 may include the pre-trained ML model 604. The pre-trained ML model 604 may reconvert the second sample coded-texture values into a second sample compressed bit-stream. The pre-trained ML model 604 may further decode the second sample compressed bit-stream to generate the second sample texture block 606 of the second block size. In some embodiments, the second block size may be of 8×8 texels. Details of the architecture of the pre-trained ML model 604 are provided, for example in FIG. 7.

The circuitry 202 may further generate the ground truth texture block 610 from the first sample texture block 602. For example, the circuitry 202 may generate the ground truth texture block 610 based on application of the multiplier function 612 on the first sample texture block 602.

The ground truth texture block 610 and the generated second sample texture block 606 may be passed as input to the loss function 608. The loss function 608 may be used to calculate a first loss between the second sample texture block 606 and the ground truth texture block 610 of the second block size. The first loss may be provided to the first ML model 104A and the circuitry 202 may update weights of the first ML model 104A based on the calculated first loss. Similar to the training on the first sample texture block 602, the training of the first ML model 104A may be executed on remaining sample texture blocks.

For the generation of the super-resolution texture block 614, the generated second sample coded-texture values may be input to the V2B converter 308B. The V2B converter 308B may convert the second sample coded-texture values into the second sample compressed bit-stream. The second sample compressed bit-stream may be input to the decoder 308A, which may generate the super-resolution texture block 614 of the second block size.

Figure 7:
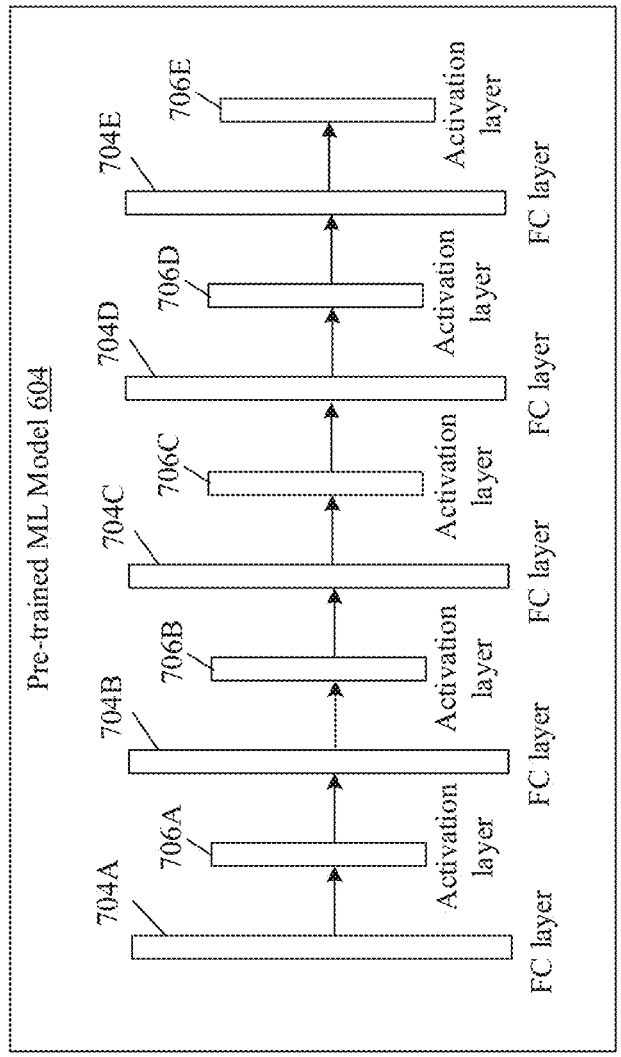
FIG. 7 is a diagram that illustrates an exemplary architecture of an exemplary pre-trained machine learning model for training of the first machine learning model, in accordance with an embodiment of the disclosure.

FIG. 7 is a diagram that illustrates an exemplary architecture of a pre-trained machine learning model for training of the first machine learning model, in accordance with an embodiment of the disclosure. FIG. 7 is explained in conjunction with elements from FIGS. 1, 2, 3, 4A, 4B, 5, and 6. With reference to FIG. 7, there is shown a diagram 700. The diagram 700 may include the pre-trained ML model 604. The pre-trained ML model 604 may include a plurality of fully connected layers and a plurality of activation layers.

The plurality of fully connected layers may include a fully connected layer 704A, a fully connected layer 704B, a fully connected layer 704C, a fully connected layer 704D, and a fully connected layer 704E. The plurality of activation layers may include an activation layer 706A, an activation layer 706B, an activation layer 706C, an activation layer 706D and an activation layer 706E. Examples of the plurality of activation layers may include, but are not limited to, the exponential linear unit, the linear activation layer, the rectified linear unit, the sigmoid function or the softmax function.

The plurality of fully connected layers and the plurality of exponential linear units may be sequentially connected. For example, the fully connected layer 704A may be connected to the activation layer 706A. The activation layer 706A may be connected to the fully connected layer 704B. The fully connected layer 704B may be connected to the activation layer 706B. The activation layer 706B may be connected to the fully connected layer 704C. The fully connected layer 704C may further be connected to the activation layer 706C. The activation layer 706C may be connected to the fully connected layer 704D. The fully connected layer 704D may be connected to the activation layer 706D. The activation layer 706D may be connected to the fully connected layer 704E. The fully connected layer 704E may be connected to the activation layer 706E.

The pre-trained ML model 604 may receive the second sample coded-texture values (as described in FIG. 6) via the fully connected layer 704A. The second sample coded-texture values may pass through the plurality of fully connected layers and the plurality of activation layers to reconvert the second sample coded-texture values into the second sample compressed bit-stream. The pre-trained ML model 604 may further decode the second sample compressed bit-stream to generate the second sample texture block 606. The second sample texture block 606 may be output via the activation layer 706E. The second sample texture block 606 output by the pre-trained ML model 604 may be input to the loss function 608.

Figure 8A:
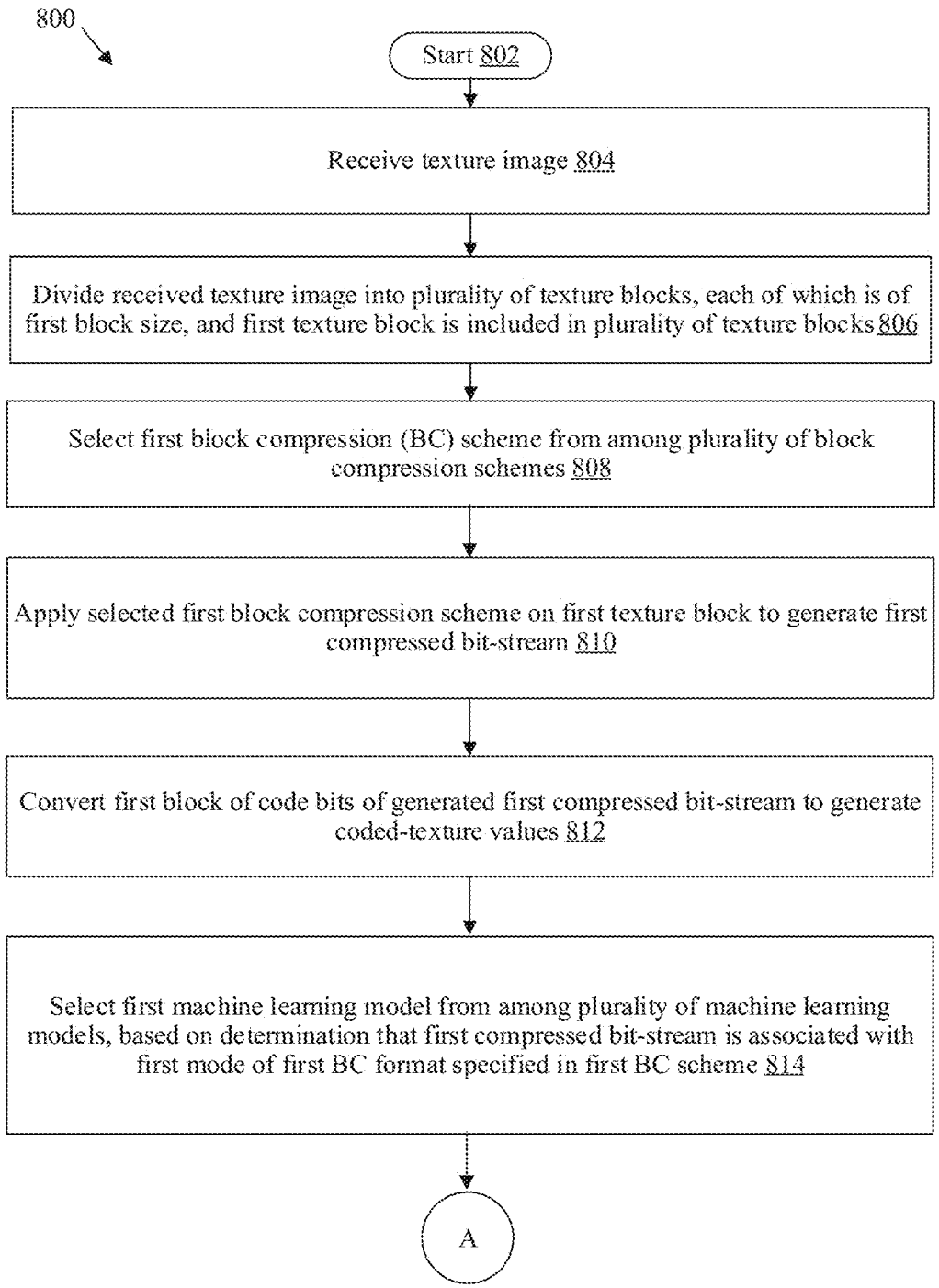
FIGS. 8A and 8B, collectively, illustrate a flowchart of an exemplary method for super-resolution of block-compressed texture, in accordance with an embodiment of the disclosure.
Figure 8B:
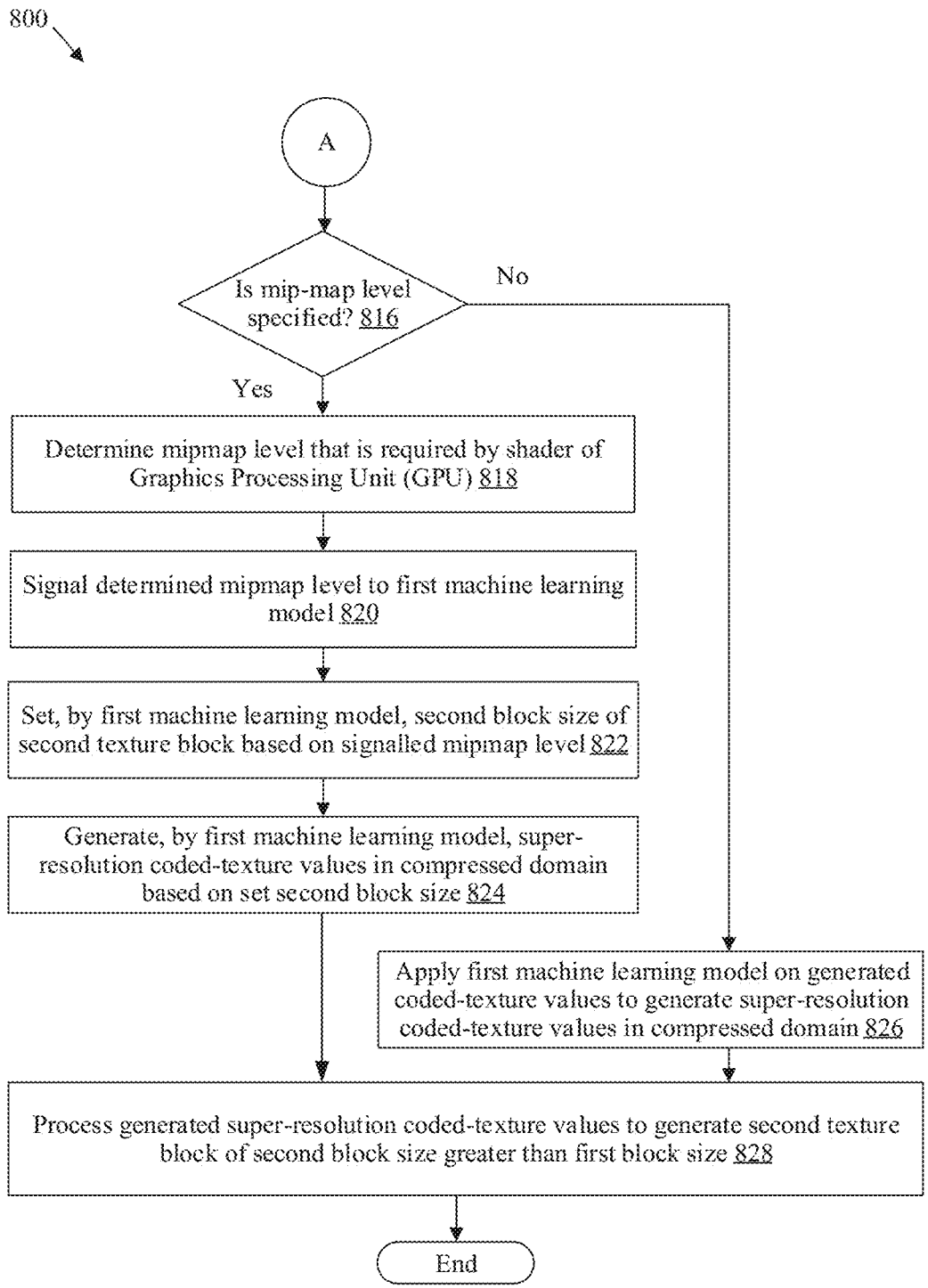

FIGS. 8A and 8B, collectively, illustrate a flowchart of an exemplary method for super-resolution of block-compressed texture, in accordance with an embodiment of the disclosure. FIGS. 8A and 8B are explained in conjunction with elements from FIGS. 1, 2, 3, 4A, 4B, 5, 6, and 7. With reference to FIGS. 8A and 8B, there is shown a flowchart 800. The method illustrated in the flowchart 800 may be executed by any computing system, such as by the system 102 or the circuitry 202. The method may start at 802 and proceed to 804.

At 804, a texture image (such as the texture image 108) may be received. In accordance with an embodiment, the circuitry 202 may be configured to receive the texture image 108. In some embodiments, the texture image 108 may be decoded from a set of texture filed, which may be included in a software package or a texture library of a graphics rendering application. Details of the reception of the texture image 108 are further provided, for example in FIG. 4A.

At 806, the received texture image 108 may be divided into a plurality of texture blocks. In accordance with an embodiment, the circuitry 202 may be configured to divide the received texture image 108 into the plurality of texture blocks. Each of the plurality of texture blocks may be of the first block size (for example, 4×4 texels). The first texture block 110 may be included in the plurality of texture blocks.

At 808, a first BC scheme may be selected from among a plurality of BC schemes. In accordance with an embodiment, the circuitry 202 may be configured to select the first BC scheme. The first BC scheme may specify a first BC format, which may be specified in S3 Texture Compression (S3TC) and may be one of BC1 format, BC2 format, BC3 format, BC4 format, BC5 format, BC6 format, or the BC7 format. Details of the selection of the first BC scheme are further described, for example in FIG. 4A.

At 810, the selected first block compression scheme may be applied on the first texture block 110 to generate the first compressed bit-stream. In accordance with an embodiment, the circuitry 202 may be configured to apply the selected first block compression scheme on the first texture block 110 to generate the first compressed bit-stream. The first compressed bit-stream may be formatted in accordance with the first BC format of the selected first BC scheme. Details of the application of the selected first BC scheme on the first texture block 110 to generate the first compressed bit-stream are further described, for example in FIG. 4A.

At 812, the first block of code bits of the generated first compressed bit-stream may be converted to generate the coded-texture values. In accordance with an embodiment, the circuitry 202 may be configured to convert the first block of code bits of the generated first compressed bit-stream to generate the coded-texture values. Details of the conversion of the first block of code bits to generate the coded-texture values are further provided, for example in FIG. 4B.

At 814, a first ML model (such as the first ML model 104A) may be selected from a plurality of ML models (such as the plurality of ML models 104). In accordance with an embodiment, the circuitry 202 may be configured to select the first ML model 104A from the plurality of ML models 104, based on a determination that the first compressed bit-stream is associated with the first mode of the first BC format specified in the first BC scheme. Each of the ML model (such as the first ML model 104A, the second ML model 104B and the Nth ML model 104N) of the plurality of ML models 104 may be associated with a corresponding mode of the plurality of modes of the first BC format. Details of the selection of the first ML model 104A from the plurality of ML models 104 are further provided, for example in FIG. 4B.

At 816, it may be determined whether a mipmap level is specified. In accordance with an embodiment, the circuitry 202 may be configured to determine if the mipmap level is specified. In case the mipmap level is specified, control may pass to 818. Otherwise, control may pass to 828.

At 818, the mipmap level required by a shader of a GPU (such as the GPU 206) may be determined, based on the determination that the mipmap level is specified. In accordance with an embodiment, the circuitry 202 may be configured to determine the mipmap level required by the shader of the GPU 206. Details related to the mipmap level are provided, for example in FIG. 4B.

At 820, the determined mipmap level may be signaled to the first ML model 104A. In accordance with an embodiment, the circuitry 202 may be configured to signal the determined mipmap level to the first ML model 104A. Details of the signaling of the determined mipmap level are further described, for example in FIG. 4B.

At 822, the second block size of the second texture block 112 may be set by the first ML model 104A, based on the signaled mipmap level. In accordance with an embodiment, the first ML model 104A may set the second block size of the second texture block 112 based on the signaled mipmap level.

At 824, the super-resolution coded-texture values may be generated in the compressed domain, based on the set second block size. In accordance with an embodiment, the first ML model 104A may generate the super-resolution coded-texture values in the compressed domain, based on the set second block size. Details of the generation of the super-resolution coded-texture values are further provided, for example in FIG. 4B.

At 826, the first ML model 104A may be applied on the generated coded-texture values to generate the super-resolution coded-texture values in the compressed domain. In accordance with an embodiment, the circuitry 202 may be configured to apply the first ML model 104A on the generated coded-texture values to generate the super-resolution coded-texture values in the compressed domain. Details of the application of the first ML model 104A for the generation of the super-resolution coded-texture values are further provided, for example in FIG. 4B.

At 828, the generated super-resolution coded-texture values may be processed to generate the second texture block 112 of the second block size. In accordance with an embodiment, the circuitry 202 may be configured to process the generated super-resolution coded-texture values to generate the second texture block 112 of the second block size. The second block size may be greater than the first block size. Details of the processing of the generated super-resolution coded-texture values to generate the second texture block 112 are further provided, for example in FIG. 4B. Control may pass to end.

Although the flowchart 800 is illustrated as discrete operations, such as 802, 804, 806, 808, 810, 812, 814, 816, 818, 820, 822, 824, 826, and 828, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a system (such as the system 102). The computer-executable instructions may cause the machine and/or computer to perform operations that may include receiving a first texture block (such as the first texture block 110) of a first block size. The operations may further include generating coded-texture values in a compressed domain based on application of a first block compression (BC) scheme on the received first texture block 110. The operations may further include applying a first machine learning model (such as the first ML model 104A) on the generated coded-texture values to generate super-resolution coded-texture values in the compressed domain. Furthermore, the operations may include processing the generated super-resolution coded-texture values to generate a second texture block (such as the second texture block 112) of a second block size. The second block size may be greater than the first block size.

Exemplary aspects of the disclosure may provide a system (such as the system 102 of FIG. 1) that includes circuitry (such as the circuitry 202). The circuitry 202 may be configured to receive a first texture block (such as the first texture block 110) of a first block size. The circuitry 202 may further generate coded-texture values in a compressed domain based on application of a first block compression (BC) scheme on the received first texture block 110. The circuitry 202 may be further configured to apply a first machine learning model (such as the first ML model 104A) on the generated coded-texture values to generate super-resolution coded-texture values in the compressed domain. Furthermore, the circuitry 202 may be configured to process the generated super-resolution coded-texture values to generate a second texture block (such as the second texture block 112) of a second block size. The second block size may be greater than the first block size.

In accordance with an embodiment, the method may include receiving the texture image 402A. The method may further include dividing the received texture image 402A into a plurality of texture blocks, each of which is of the first block size, and the first texture block 404A is included in the plurality of texture blocks.

In accordance with an embodiment, the method further includes selecting the first BC scheme from among a plurality of block compression schemes. The method further includes applying the selected first block compression scheme on the first texture block 404A to generate a first compressed bit-stream. The first compressed bit-stream may be formatted in accordance with a first BC format of the selected first BC scheme.

In accordance with an embodiment, the method further includes converting a first block of code bits of the generated first compressed bit-stream to generate the coded-texture values.

In accordance with an embodiment, the method further includes selecting the first ML model 104A from among the plurality of ML models 104, based on a determination that the first compressed bit-stream is associated with a first mode of a first BC format specified in the first BC scheme. Each machine learning model of the plurality of ML models 104 may be associated with a corresponding mode of a plurality of modes of the first BC format.

In accordance with an embodiment, the application of the selected first ML model 104A may further include feeding the generated coded-texture values as input to the selected first ML model 104A. The application may further include generating, by the selected first ML model 104A, the super-resolution coded-texture values, based on the input. The super-resolution coded-texture values may include sets of coded-texture values that may be required to upscale the first texture block 404A to the second texture block 412A.

In accordance with an embodiment, the processing may further include converting the super-resolution coded-texture values in the compressed domain to a second compressed bit-stream. The second compressed bit-stream may include a set of second blocks of coded-bits, each of which represents, in the compressed domain, a corresponding portion of the second texture block 412A. The processing may further include decoding the second compressed bit-stream to generate the second texture block 412A.

In accordance with an embodiment, the decoding may include application of a first block decoding scheme in a block-wise manner on the set of second blocks of coded-bits to generate respective portions of the second texture block 412A in a first-in-first-out (FIFO) pattern.

In accordance with an embodiment, the first ML model 104A may be a neural network-based model.

In accordance with an embodiment, the first BC scheme may specify a first BC format which is one of a BC1 format, a BC2 format, a BC3 format, a BC4 format, a BC5 format, a BC6 format, or a BC7 format.

In accordance with an embodiment, the first BC format specified in the first BC scheme is in a first mode, which is one of fourteen modes of the BC6 format or eight modes of the BC7 format.

In accordance with an embodiment, the first block size may be a 4×4 texels, and a ratio of the second block size to the first block size is a positive integer that is greater than one.

In accordance with an embodiment, the method may further include determining a mipmap level that is required by a shader of the GPU 206. The method may further include signaling the determined mipmap level to the first ML model 104A. Based on the signaled mipmap level, the method may include setting, by the first ML model 104A, the second block size of the second texture block 412A. The method may further include generating, by the first ML model 104A, the super-resolution coded-texture values in the compressed domain based on the set second block size.

In accordance with an embodiment, the method may include training of the first ML model 104A. The training may include receiving the first sample texture block 602 of the first block size. The training may further include generating a first sample compressed bit-stream by applying the first BC scheme on the received first sample texture block 602. The training may further include converting the sample compressed bit-stream into first sample coded-texture values. Further, the training may include applying the first ML model 104A to the first sample coded-texture values to generate second sample coded-texture values. The training may further include reconverting the second sample coded-texture values into a second sample compressed bit-stream. Moreover, the training may include reconverting the second sample coded-texture values into a second sample compressed bit-stream. The training may further include decoding the second sample compressed bit-stream to generate the second sample texture block 606 of the second block size. The training further includes calculating a first loss between the second sample texture block 606 and the ground truth texture block 610 of the second block size. The training may further include updating weights of the first ML model 104A based on the calculated first loss.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A method, comprising:
   receiving a first texture block of a first block size;
   generating coded-texture values in a compressed domain based on application of a first block compression (BC) scheme on the received first texture block;
   applying a first machine learning model on the generated coded-texture values to generate super-resolution coded-texture values in the compressed domain; and
   processing the generated super-resolution coded-texture values to generate a second texture block of a second block size, wherein the second block size is greater than the first block size, wherein the processing of the generated super-resolution coded-texture values comprises:
      converting the super-resolution coded-texture values in the compressed domain to a first compressed bit-stream,
      wherein
         the first compressed bit-stream comprises a set of second blocks of coded-bits, and
         each second block of coded-bits represents, in the compressed domain, a corresponding portion of the second texture block; and
      decoding the first compressed bit-stream to generate the second texture block of the second block size.

2. The method according to claim 1, further comprising:
   receiving a texture image; and
   dividing the received texture image into a plurality of texture blocks,
   wherein
   each texture block of the plurality of texture blocks is of the first block size, and
   the first texture block is included in the plurality of texture blocks.

3. The method according to claim 1, further comprising:
   selecting the first BC scheme from among a plurality of block compression schemes; and
   applying the selected first block compression scheme on the first texture block to generate a second compressed bit-stream,
   wherein the second compressed bit-stream is formatted based on a first BC format of the selected first BC scheme.

4. The method according to claim 3, further comprising converting a first block of code bits of the generated second compressed bit-stream to generate the coded-texture values.

5. The method according to claim 4, further comprising selecting the first machine learning model from among a plurality of machine learning models, based on a determination that the second compressed bit-stream is associated with a first mode of the first BC format specified in the first BC scheme,
   wherein each machine learning model of the plurality of machine learning models is associated with a corresponding mode of a plurality of modes of the first BC format.

6. The method according to claim 5, wherein the applying the selected first machine learning model further comprises:
   feeding the generated coded-texture values as input to the selected first machine learning model; and
   generating, by the selected first machine learning model, the super-resolution coded-texture values based on the input,
      wherein the super-resolution coded-texture values include sets of coded-texture values that are required to upscale the first texture block to the second texture block.

7. The method according to claim 1, wherein the decoding comprises applying a first block decoding scheme in a block-wise manner on the set of second blocks of coded-bits to generate respective portions of the second texture block in a first-in-first-out (FIFO) pattern.

8. The method according to claim 1, wherein the first machine learning model is a neural network-based model.

9. The method according to claim 1, wherein the first BC scheme specifies a first BC format which is one of a BC1 format, a BC2 format, a BC3 format, a BC4 format, a BC5 format, a BC6 format, or a BC7 format.

10. The method according to claim 9, wherein the first BC format specified in the first BC scheme is in a first mode, which is one of fourteen modes of the BC6 format or eight modes of the BC7 format.

11. The method according to claim 1, wherein
   the first block size is 4×4 texels, and
   a ratio of the second block size to the first block size is a positive integer that is greater than one.

12. The method according to claim 1, further comprising:
   determining a mipmap level that is required by a shader of a Graphics Processing Unit (GPU);
   signaling the determined mipmap level to the first machine learning model;
   setting, by the first machine learning model, the second block size of the second texture block based on the signaled mipmap level; and
   generating, by the first machine learning model, the super-resolution coded-texture values in the compressed domain based on the set second block size.

13. The method according to claim 1, further comprising training the first machine learning model, wherein the training comprises:
   receiving a first sample texture block of the first block size;
   generating a first sample compressed bit-stream by applying the first BC scheme on the received first sample texture block;
   converting the first sample compressed bit-stream into first sample coded-texture values;
   applying the first machine learning model to the first sample coded-texture values to generate second sample coded-texture values;
   reconverting the second sample coded-texture values into a second sample compressed bit-stream;
   decoding the second sample compressed bit-stream to generate a second sample texture block of the second block size;
   calculating a first loss between the second sample texture block and a ground truth texture block of the second block size; and updating weights of the first machine learning model based on the calculated first loss.

14. A system, comprising:
circuitry configured to:
receive a first texture block of a first block size;
generate coded-texture values in a compressed domain based on application of a first block compression (BC) scheme on the received first texture block;
apply a first machine learning model on the generated coded-texture values to generate super-resolution coded-texture values in the compressed domain; and
process the generated super-resolution coded-texture values to generate a second texture block of a second block size, wherein the second block size is greater than the first block size, wherein the circuitry is further configured to process the generated super-resolution coded-texture values by:
a conversion of the super-resolution coded-texture values in the compressed domain to a first compressed bit-stream,
wherein
the first compressed bit-stream comprises a set of second blocks of coded-bits, and
each second block of coded-bits represents, in the compressed domain, a corresponding portion of the second texture block; and
a decoding of the first compressed bit-stream to generate the second texture block of the second block size.

15. The system according to claim 14, wherein the circuitry is further configured to:
select the first BC scheme from among a plurality of block compression schemes; and
apply the selected first block compression scheme on the first texture block to generate a second compressed bit-stream,
wherein the second compressed bit-stream is formatted in accordance with a first BC format of the selected first BC scheme; and
convert a first block of code bits of the generated second compressed bit-stream to generate the coded-texture values.

16. The system according to claim 15, wherein the circuitry is further configured to select the first machine learning model from among a plurality of machine learning models, based on a determination that the second compressed bit-stream is associated with a first mode of the first BC format specified in the first BC scheme,
wherein each machine learning model of the plurality of machine learning models is associated with a corresponding mode of a plurality of modes of the first BC format.

17. The system according to claim 14, wherein the circuitry is further configured to apply the first machine learning model by feeding the generated coded-texture values as input to the selected first machine learning model, wherein
the first machine learning model generates the super-resolution coded-texture values, based on the input, and
the super-resolution coded-texture values include sets of coded-texture values that are required to upscale the first texture block to the second texture block.

18. A non-transitory computer-readable medium having stored thereon, computer-executable instructions that when executed by a system, causes the system to execute operations, the operations comprising:
receiving a first texture block of a first block size;
generating coded-texture values in a compressed domain based on application of a first block compression (BC) scheme on the received first texture block;
applying a first machine learning model on the generated coded-texture values to generate super-resolution coded-texture values in the compressed domain; and
processing the generated super-resolution coded-texture values to generate a second texture block of a second block size, wherein the second block size is greater than the first block size, wherein the processing of the generated super-resolution coded-texture values comprises:
converting the super-resolution coded-texture values in the compressed domain to a first compressed bit-stream,
wherein
the first compressed bit-stream comprises a set of second blocks of coded-bits, and
each second block of coded-bits represents, in the compressed domain, a corresponding portion of the second texture block; and
decoding the first compressed bit-stream to generate the second texture block of the second block size.

\* \* \* \* \*